Sept. 24, 1929.  T. K. CUMMINS  1,729,569
BRAKE HANGER BRACKET
Filed Feb. 2, 1927   2 Sheets-Sheet 1

Inventor
Thomas K. Cummins

Sept. 24, 1929.　　　T. K. CUMMINS　　　1,729,569
BRAKE HANGER BRACKET
Filed Feb. 2, 1927　　　2 Sheets-Sheet 2
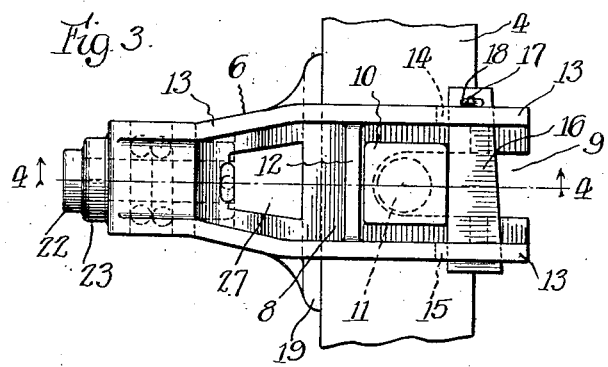
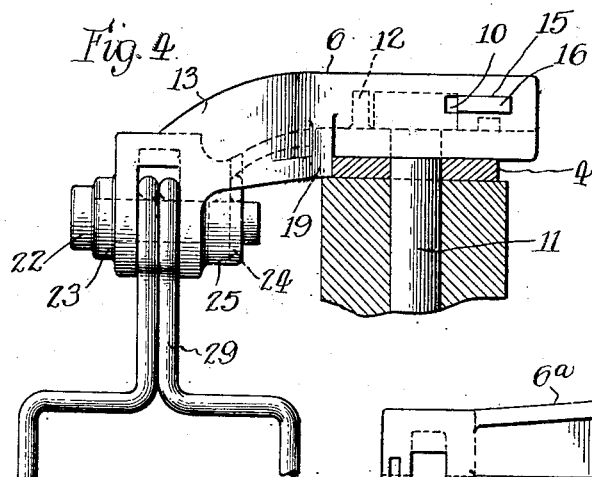
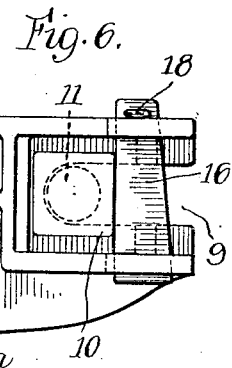
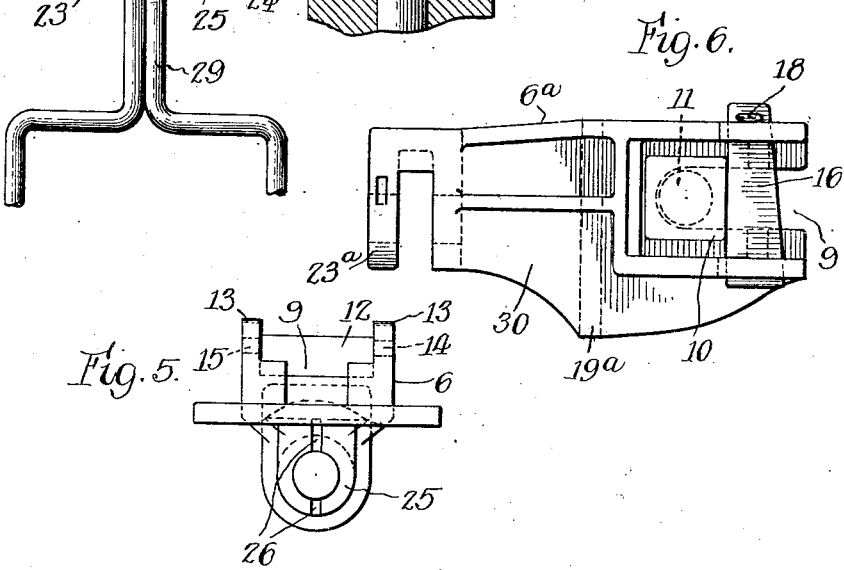
Inventor:
Thomas K. Cummins,
Atty.

Patented Sept. 24, 1929

1,729,569

UNITED STATES PATENT OFFICE

THOMAS K. CUMMINS, OF ST. PAUL, MINNESOTA, ASSIGNOR TO NORTHERN MALLEABLE IRON COMPANY, OF ST. PAUL, MINNESOTA, A CORPORATION OF MINNESOTA

BRAKE-HANGER BRACKET

Application filed February 2, 1927. Serial No. 165,284.

My invention relates to brake hanger brackets or like devices.

One of the objects of the invention is to provide a simple and practical construction of brake hanger bracket.

Other objects of the invention are to make the bracket as simple and compact as possible so as to reduce the cost of manufacture; to arrange to secure the bracket to the car frame or truck in a firm and rigid manner so that the bracket will, at all times be held firmly in its proper position and thereby hold the brake and equipment always in proper position; to arrange for supporting brake hangers on either side of the truck wheels by the same construction of bracket so that right and left brackets will not be necessary; to permit the pin for holding the brake hanger to be inserted in position in an easy and convenient manner; to arrange for the effective holding of said pin in position; to arrange for the use of a single bracket construction with truck column bolts of different sizes so that separate bracket constructions will not be necessary for the different sized bolts; and to accomplish the foregoing and other desirable results in a simple, practical and expeditious manner.

In the accompanying drawings:

Fig. 3 is a plan view of the bracket applied to the arch bar of the truck shown in Figs. 1 and 2.

Fig. 4 is a vertical section taken on line 4—4 in Fig. 3.

Fig. 5 is an end view of the hanger and Fig. 6 is a plan view of a modified form of device.

Figure 1:
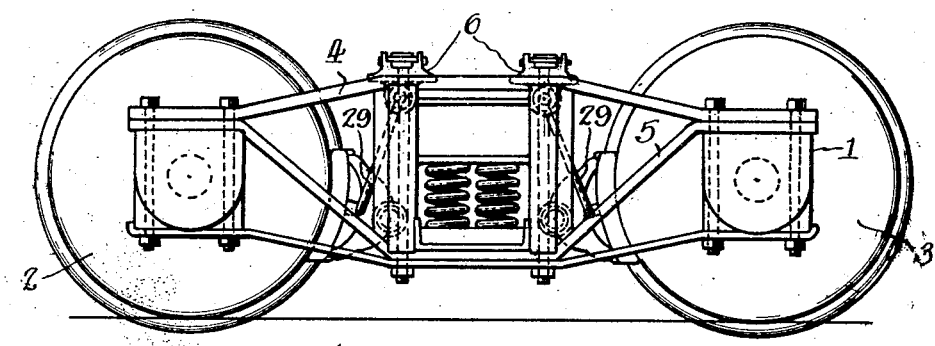
Fig. 1 is a side elevation of a car truck provided with brake hanger brackets embodying my invention.
Figure 2:
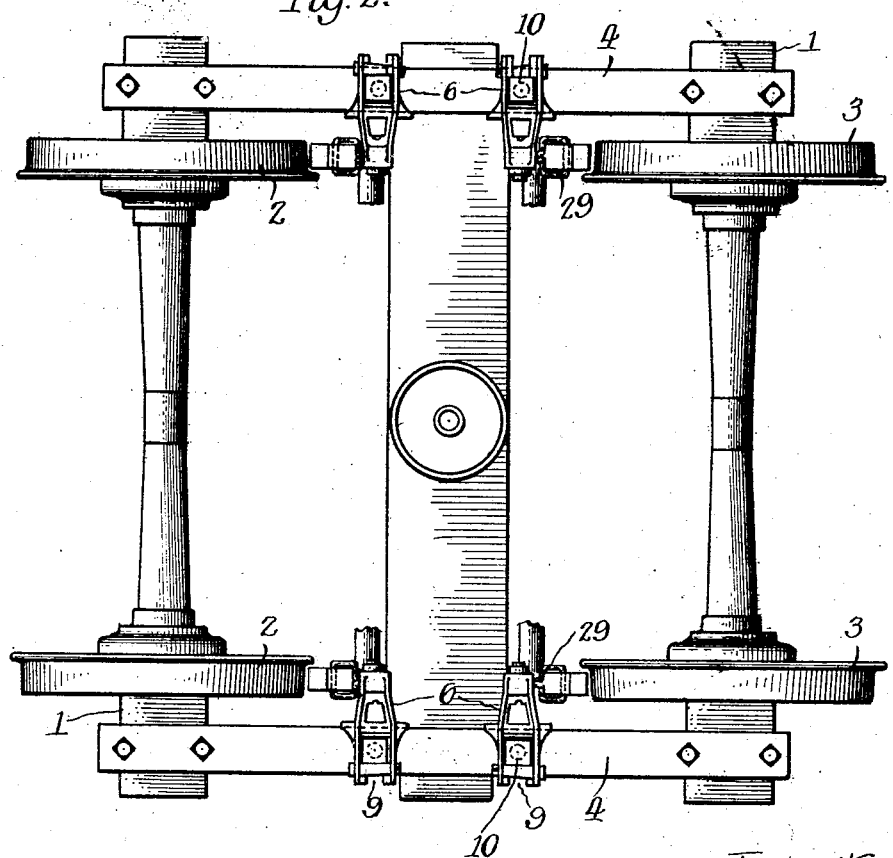
Fig. 2 is a plan view of the same.

Referring to the drawings and particularly to Figs. 1 to 5 inclusive, I show a car truck 1 provided with wheels 2, 2 and 3, 3 and also provided with connecting and supporting arch bars 4 and 5.

Brake hanger brackets 6 embodying my invention are shown applied to this truck 1 so as to support the brake beams for all of the wheels. Each hanger bracket 6 is adapted to support one end of a brake beam and accordingly there are two hangers for each brake beam making four hangers in all for the truck.

Each hanger bracket is preferably mounted on an upper arch bar 4 and to such end preferably comprises a body portion 8 adapted to rest upon the arch bar 4 and provided with a longitudinal slot 9 by means of which the hanger may be slipped underneath the head 10 of the adjacent truck column bolt 11 for fastening the hanger to the arch bar.

Each hanger 6 is preferably provided with a transverse or cross partition or flange 12 to form a pocket for bolt head 10, and furthermore longitudinally extending ribs or flanges 13, 13 are preferably provided and these are provided with slots 14 and 15 to accommodate a wedge 16, which may fit and act against the side of bolt head 10. Wedge 16 is preferably provided with an aperture 17 to accommodate a cotter pin 18.

Each bracket 6 is also preferably provided with a downwardly extending transverse shoulder or abutment 19 to fit against the side of the arch bar 4. Thus by driving the wedge 16 into position after the hanger bracket has been secured to the arch bar 4 by means of bolt 11, the bracket will be moved lengthwise and shoulder 19 clamped against arch bar 4 by reason of the wedge 16 acting against the bolt head 10, holding the bracket firmly in position so that the hanger and equipment will be at all times maintained in its proper place. Furthermore, the wedge 16 in this arrangement tends to hold bolt 11 against turning and thereby tends to prevent the unscrewing of the nut from the lower end of the bolt or tends to prevent the bolt from working out of its place and causing trouble in case the nut does becomes unscrewed.

In order to accommodate different sizes of bolts 11, which different sizes are used in different types of equipment, wedges 16 of different size may be used. Usually two different wedges 16 of different size will take care of the different sized bolts of which there are ordinarily three. To accommodate wedges 16, the slots 14 and 15 are preferably made of substantial length so that a wide wedge as well as a narrow one may be accommodated. This makes the hanger bracket in effect, an adjustable one, making it capable of use in different types or forms of trucks and so gives it a wide range or extent of use which is exceedingly desirable.

The bracket 6 is also provided with a bearing or holder for a hanger pin 22, said bearing being preferably in the form of a tubular or hub member 23. This bearing 23 is preferably formed at the end of the body portion 8 and at the end of the side ribs or flanges 13, and as a preferred arrangement, said body 8 and ribs 13 are extended downwardly as shown in Fig. 4 so as to be less liable to break and also to permit manipulation of the hanger pin 22 more conveniently.

The hanger pin 22 is preferably provided with a cotter pin 24 to accommodate which the end 25 of the hub or bearing 23 is preferably provided with slots 26, 26. A slot or recess 27 is also preferably provided near one end of the bracket. In this way the hanger pin 22 may be readily inserted from the outside and then the cotter pin 24 may be driven into position so as to hold the hanger pin against rotation and maintain it firmly in position.

A hanger loop 29 is shown supported by the hanger pin 22 so as to support the brake beam equipment in the usual way.

It will be seen that in the arrangement as above described, the bracket is of a very simple construction, and may be readily made, taking but little metal, so that it will be comparatively inexpensive. Furthermore, in case one of the brackets becomes broken or worn so that it must be replaced, the expense of replacement is but slight, because the bracket is small and it is only necessary to replace a small bracket serviceable for a single hanger loop instead of a large bracket serviceable for two hanger loops as would be the case in case such a large bracket were used as has been customary in the past. Furthermore, the bracket may be made as shown, with the center of the hanger pin in alignment with the center of the truck column bolt so that the brackets may be used equally well for either side or ends of the truck and consequently rights and lefts will not be necessary.

Referring to the device shown in Fig. 6, this bracket 6ª is to accommodate certain types of equipment wherein the center of the hanger pin is not in alignment with the truck column bolt and in such case the bearing member 23ª is at one side of the bracket as compared to its position in the other construction and furthermore, a side web 30 is preferably provided to accommodate the torsional strain which would be put on the bracket by reason of the lack of alignment of the hanger pin and column bolt. In this case right and left brackets would be required.

It will be understood that changes and modifications may be made without departing from the spirit of the invention.

What I claim is:

1. A brake hanger bracket provided with means for mounting it upon the truck arch bar and with means whereby the bracket is held in position on said bar by the truck column bolt, and additional means for clamping the bracket to said arch bar.

2. A brake hanger bracket provided with means whereby it may be mounted on the truck arch bar and held in position by the truck column bolt and means for clamping the bracket sidewise to hold it firmly in position.

3. A brake hanger bracket provided with means whereby it may be mounted on the truck arch bar and held in position by the truck column bolt and a wedge for clamping the bracket sidewise to hold it firmly in position.

4. A brake hanger bracket having an abutment in combination with a wedge for drawing upon the bracket and drawing said abutment against a cooperating abutment to hold the bracket against lateral swinging movement.

5. A brake hanger bracket having an abutment and also having means to permit the engagement of a truck column bolt head with the bracket in combination with means for acting upon the bracket and bolt head to draw said abutment against a cooperating abutment and thereby hold the bracket against a swinging movement.

6. A brake hanger bracket having an abutment and also having means to permit the engagement of a truck column bolt head with the bracket in combination with a wedge for acting upon the bracket and bolt head to draw said abutment against a cooperating abutment and thereby hold the bracket against a swinging movement.

7. A brake hanger bracket having a body portion provided with a slot for a truck column bolt and also provided with a web to be engaged by the head of said bolt, said bracket being also provided with a transversely extending abutment to engage the side of the arch bar and means for acting upon the bracket to draw it longitudinally and cause said shoulder or abutment to be clamped against the side of the arch bar.

8. A brake hanger bracket having a body portion provided with a slot for a truck column bolt and also provided with a web to be engaged by the head of said bolt, said bracket being also provided with a transversely extending abutment to engage the side of the arch bar and a wedge for acting upon the bracket to draw it longitudinally and cause said shoulder or abutment to be clamped against the side of the arch bar.

9. A brake hanger bracket having a longitudinal slot for the accommodation of a truck column bolt and also having web members to be engaged by the head of said bolt, said bracket also having a transversely extending abutment to engage the side of the truck arch bar.

10. A brake hanger bracket having a longitudinal slot for the accommodation of a truck column bolt and also having web members to be engaged by the head of said bolt, said bracket also having a transversely extending abutment to engage the side of the truck arch bar, and means acting against the head of said bolt for drawing the bracket lengthwise to cause said transverse abutment to be clamped against the arch bar.

11. A brake hanger bracket having a longitudinal slot for the accommodation of a truck column bolt and also having web members to be engaged by the head of said bolt, said bracket also having a transversely extending abutment to engage the side of the truck arch bar, and a wedge acting against the head of said bolt for drawing the bracket lengthwise to cause said transverse abutment to be clamped against the arch bar.

12. A brake hanger bracket having a longitudinal slot for the truck column bolt and also having web portions at the sides of the slot to be engaged by the head of the bolt, said bracket also having upstanding members provided with cross slots for a wedge and also having a downwardly extending abutment to engage the inner side of the arch bar.

13. A brake hanger bracket having a longitudinal slot for the truck column bolt and also having web portions at the sides of the slot to be engaged by the head of the bolt, said bracket also having upstanding members provided with cross slots for a wedge and also having a downwardly extending abutment to engage the inner side of the arch bar, in combination with a wedge extended through said cross slots.

14. A brake hanger bracket having a longitudinal slot for the truck column bolt and also having web portions at the sides of the slot to be engaged by the head of the bolt, said bracket also having upstanding members provided with cross slots for a wedge and also having a downwardly extending abutment to engage the inner side of the arch bar, said cross slots being of substantial width to accommodate wedges of different widths.

15. A brake hanger bracket provided with a hanger pin bearing having its center in alignment with the center of the truck column bolt.

16. A brake hanger bracket having a longitudinal slot for the truck column bolt and also having a hanger pin bearing substantially in alignment with said slot.

17. A brake hanger bracket having longitudinally extending flanges 13 situated on opposite sides of the bracket and having a slot for a fastening bolt located substantially midway between the flanges 13 and a hanger pin bearing located so as to position the axis of the pin also substantially midway between said side flanges 13.

In witness whereof, I hereunto subscribe my name this 22d day of January A. D., 1927.

THOMAS K. CUMMINS.